United States Patent
Joshi et al.

(10) Patent No.: US 9,922,488 B2
(45) Date of Patent: Mar. 20, 2018

(54) WIRELESS COMMUNICATION FOR CONSUMER-OPERATED KIOSKS

(71) Applicant: Redbox Automated Retail, LLC, Bellevue, WA (US)

(72) Inventors: Holly Jean Joshi, Chicago, IL (US); Roe J. McFarlane, Chicago, IL (US)

(73) Assignee: Redbox Automated Retail, LLC, Bellevue, WA (US)

( * ) Notice: Subject to any disclaimer, the term of this patent is extended or adjusted under 35 U.S.C. 154(b) by 635 days.

(21) Appl. No.: 14/055,472

(22) Filed: Oct. 16, 2013

(65) Prior Publication Data

US 2015/0105901 A1    Apr. 16, 2015

(51) Int. Cl.
| | | |
|---|---|---|
| G06Q 20/20 | (2012.01) | |
| G07F 11/00 | (2006.01) | |
| G06Q 20/18 | (2012.01) | |
| G06Q 20/32 | (2012.01) | |

(52) U.S. Cl.
CPC ........... *G07F 11/002* (2013.01); *G06Q 20/18* (2013.01); *G06Q 20/322* (2013.01); *G06Q 20/327* (2013.01)

(58) Field of Classification Search
CPC combination set(s) only.
See application file for complete search history.

(56) References Cited

U.S. PATENT DOCUMENTS

| | | |
|---|---|---|
| 3,785,524 A | 1/1974 | Smith |
| 4,598,810 A | 7/1986 | Shore et al. |
| 4,608,679 A | 8/1986 | Rudy et al. |
| 4,789,045 A | 12/1988 | Pugh |
| 4,812,629 A | 3/1989 | O'Neil et al. |
| 4,814,592 A | 3/1989 | Bradt et al. |
| 4,839,505 A | 6/1989 | Bradt et al. |
| 4,839,875 A | 6/1989 | Kuriyama et al. |
| 4,858,743 A | 8/1989 | Paraskevakos et al. |
| 4,860,876 A | 8/1989 | Moore et al. |
| 4,866,661 A | 9/1989 | de Prins |
| 4,872,154 A | 10/1989 | Sakagami et al. |

(Continued)

FOREIGN PATENT DOCUMENTS

| | | |
|---|---|---|
| JP | 11-53638 | 6/1983 |
| JP | 407182659 | 7/1995 |

(Continued)

OTHER PUBLICATIONS

International Search Report and Written Opinion for International Application No. PCT/US2014/059668, dated Dec. 24, 2014, 12 pages.

(Continued)

*Primary Examiner* — Gene O Crawford
*Assistant Examiner* — Stephen L Akridge
(74) *Attorney, Agent, or Firm* — Perkins Coie LLP

(57) ABSTRACT

Systems, apparatus, and methods for kiosk accessibility via a mobile device. In some embodiments, a wireless mobile device has input features such as voice-control and GUI-based buttons that assist visually impaired people to send wireless messages for accessing features of a kiosk. The kiosk is equipped with wireless communication hardware and or software to receive messages from the mobile device for performing various kiosk-related operations, such a renting, vending, and or returning a product.

17 Claims, 12 Drawing Sheets

(56) References Cited

U.S. PATENT DOCUMENTS

| | | |
|---|---|---|
| 4,893,705 A | 1/1990 | Brown |
| 4,896,024 A | 1/1990 | Morello et al. |
| 4,903,815 A | 2/1990 | Hirschfeld et al. |
| 4,915,205 A | 4/1990 | Reid et al. |
| 4,967,403 A | 10/1990 | Ogawa et al. |
| 4,995,498 A | 2/1991 | Menke |
| 5,007,518 A | 4/1991 | Crooks et al. |
| 5,013,897 A | 5/1991 | Harman et al. |
| 5,028,766 A | 7/1991 | Shah |
| 5,088,586 A | 2/1992 | Isobe et al. |
| 5,095,195 A | 3/1992 | Harman et al. |
| 5,107,667 A | 4/1992 | Tone et al. |
| 5,133,441 A | 7/1992 | Brown |
| 5,159,560 A | 10/1992 | Newell et al. |
| 5,273,183 A | 12/1993 | Tuttobene |
| 5,319,705 A | 6/1994 | Halter et al. |
| 5,418,713 A | 5/1995 | Allen |
| 5,445,295 A | 8/1995 | Brown |
| 5,459,306 A | 10/1995 | Stein et al. |
| 5,576,951 A | 11/1996 | Lockwood |
| 5,613,620 A | 3/1997 | Center et al. |
| 5,633,839 A | 5/1997 | Alexander et al. |
| 5,644,727 A | 7/1997 | Atkins |
| 5,647,505 A | 7/1997 | Scott |
| 5,685,423 A | 11/1997 | Hunt |
| 5,699,262 A | 12/1997 | Lang et al. |
| 5,715,403 A | 2/1998 | Stefik |
| 5,724,521 A | 3/1998 | Dedrick |
| 5,739,512 A | 4/1998 | Tognazzini |
| 5,748,485 A | 5/1998 | Christiansen et al. |
| 5,761,071 A | 6/1998 | Bernstein et al. |
| 5,769,269 A | 6/1998 | Peters |
| 5,819,092 A | 10/1998 | Ferguson et al. |
| 5,822,216 A | 10/1998 | Satchell, Jr. et al. |
| 5,822,291 A | 10/1998 | Brindze et al. |
| 5,826,267 A | 10/1998 | McMillan |
| 5,838,648 A | 11/1998 | Litsche et al. |
| 5,844,808 A | 12/1998 | Konsmo et al. |
| 5,847,957 A | 12/1998 | Cohen et al. |
| 5,848,593 A | 12/1998 | McGrady et al. |
| 5,850,442 A | 12/1998 | Muftic |
| 5,860,362 A | 1/1999 | Smith |
| 5,875,110 A | 2/1999 | Jacobs |
| 5,900,608 A | 5/1999 | Iida |
| 5,934,439 A | 8/1999 | Kanoh et al. |
| 5,938,510 A | 8/1999 | Takahashi et al. |
| 5,943,423 A | 8/1999 | Muftic et al. |
| 5,950,173 A | 9/1999 | Perkowski |
| 5,956,876 A | 9/1999 | Burdette et al. |
| 5,971,273 A | 10/1999 | Vallaire |
| 5,988,346 A | 11/1999 | Tedesco et al. |
| 5,992,686 A | 11/1999 | Cline et al. |
| 6,032,130 A | 2/2000 | Alloul et al. |
| 6,038,551 A * | 3/2000 | Barlow ............... G06Q 20/105 |
| | | 235/380 |
| 6,072,766 A | 6/2000 | Konshak |
| 6,109,524 A | 8/2000 | Kanoh et al. |
| 6,119,932 A | 9/2000 | Maloney et al. |
| 6,123,223 A | 9/2000 | Watkins |
| 6,169,483 B1 | 1/2001 | Ghaffari et al. |
| 6,182,857 B1 | 2/2001 | Hamm et al. |
| 6,201,474 B1 | 3/2001 | Brady et al. |
| 6,206,234 B1 | 3/2001 | Rawlins |
| 6,209,787 B1 | 4/2001 | Iida |
| 6,264,104 B1 | 7/2001 | Jenkins et al. |
| 6,286,139 B1 | 9/2001 | Decinque |
| 6,289,322 B1 | 9/2001 | Kitchen et al. |
| 6,321,984 B1 | 11/2001 | McCall et al. |
| 6,327,230 B1 | 12/2001 | Miller et al. |
| 6,330,491 B1 | 12/2001 | Lion |
| 6,336,098 B1 | 1/2002 | Fortenberry et al. |
| 6,366,914 B1 | 4/2002 | Stern |
| 6,424,706 B1 | 7/2002 | Katz et al. |
| 6,434,326 B2 | 8/2002 | Kondo et al. |
| 6,470,288 B1 | 10/2002 | Keidel et al. |
| 6,493,110 B1 | 12/2002 | Roberts |
| 6,513,015 B2 | 1/2003 | Ogasawara |
| 6,539,417 B2 | 3/2003 | Stern |
| 6,554,184 B1 | 4/2003 | Amos |
| 6,584,450 B1 | 6/2003 | Hastings et al. |
| 6,609,102 B2 | 8/2003 | Kolls et al. |
| 6,609,138 B1 | 8/2003 | Merriam |
| 6,688,523 B1 | 2/2004 | Koenck |
| 6,702,540 B2 | 3/2004 | Olin |
| 6,748,296 B2 | 6/2004 | Banerjee et al. |
| 6,748,539 B1 | 6/2004 | Lotspiech |
| 6,758,370 B2 | 7/2004 | Cooke et al. |
| 6,844,813 B2 * | 1/2005 | Hardman ............... G07F 5/18 |
| | | 340/539.1 |
| 6,898,942 B2 | 5/2005 | Schanin |
| 6,922,672 B1 | 7/2005 | Hailpern et al. |
| 6,954,732 B1 | 10/2005 | DeLapa et al. |
| 6,965,869 B1 | 11/2005 | Tomita et al. |
| 6,976,006 B1 | 12/2005 | Verma et al. |
| 7,058,581 B1 | 6/2006 | Young |
| 7,085,727 B2 | 8/2006 | Vanorman |
| 7,162,434 B1 | 1/2007 | Walker et al. |
| 7,234,609 B2 | 6/2007 | DeLazzer et al. |
| 7,313,692 B2 | 12/2007 | Weeks et al. |
| 7,444,296 B1 | 10/2008 | Barber et al. |
| 7,546,252 B2 | 6/2009 | Hastings et al. |
| 7,747,346 B2 | 6/2010 | Lowe et al. |
| 7,774,008 B2 * | 8/2010 | Benaouda ............. G01D 4/004 |
| | | 370/349 |
| 7,774,233 B2 | 8/2010 | Barber et al. |
| 7,787,987 B2 | 8/2010 | Kuehnrich et al. |
| 8,060,247 B2 | 11/2011 | Kaplan et al. |
| 8,433,622 B2 | 4/2013 | Gross |
| 9,240,007 B2 * | 1/2016 | Barragan Trevino ............... G06Q 20/322 |
| 2001/0011252 A1 | 8/2001 | Kasahara |
| 2001/0034567 A1 | 10/2001 | Allen et al. |
| 2001/0037207 A1 | 11/2001 | Dejaeger |
| 2002/0002467 A1 | 1/2002 | Ho |
| 2002/0046122 A1 | 4/2002 | Barber et al. |
| 2002/0082962 A1 * | 6/2002 | Farris ..................... G06Q 30/06 |
| | | 705/35 |
| 2002/0095680 A1 | 7/2002 | Davidson |
| 2003/0055735 A1 * | 3/2003 | Cameron ............... G06Q 20/04 |
| | | 705/27.1 |
| 2003/0061271 A1 | 3/2003 | Pittarelli |
| 2003/0074106 A1 | 4/2003 | Butler |
| 2003/0083934 A1 * | 5/2003 | Fostick ................. G06Q 30/02 |
| | | 705/14.38 |
| 2003/0169180 A1 * | 9/2003 | Hardman ................. G07F 5/18 |
| | | 340/870.01 |
| 2003/0200108 A1 | 10/2003 | Malnoe |
| 2004/0064371 A1 | 4/2004 | Crapo |
| 2004/0112070 A1 | 6/2004 | Schanin |
| 2004/0164146 A1 | 8/2004 | Rosenblum |
| 2004/0249711 A1 | 12/2004 | Walker et al. |
| 2005/0033855 A1 | 2/2005 | Moradi et al. |
| 2005/0216120 A1 | 9/2005 | Rosenberg et al. |
| 2005/0267819 A1 | 12/2005 | Kaplan |
| 2006/0259192 A1 * | 11/2006 | Lowe ............... G06Q 10/06311 |
| | | 700/236 |
| 2007/0050266 A1 * | 3/2007 | Barber ................. G06Q 10/087 |
| | | 705/26.1 |
| 2007/0063027 A1 * | 3/2007 | Belfer ..................... G06Q 20/18 |
| | | 235/381 |
| 2009/0005905 A1 | 1/2009 | Kuehnrich et al. |
| 2009/0048932 A1 | 2/2009 | Barber |
| 2009/0139886 A1 | 6/2009 | Blust et al. |
| 2009/0306817 A1 * | 12/2009 | Antao ....................... G07F 9/02 |
| | | 700/231 |
| 2010/0325001 A1 | 12/2010 | Barber et al. |
| 2012/0310776 A1 * | 12/2012 | Stache ............... G06Q 20/3278 |
| | | 705/26.41 |
| 2013/0024299 A1 | 1/2013 | Wong et al. |
| 2013/0073681 A1 * | 3/2013 | Jiang ........................ G06N 3/006 |
| | | 709/218 |

(56) References Cited

U.S. PATENT DOCUMENTS

2014/0192735 A1* 7/2014 Sridharan ............... H04W 8/26
370/329

FOREIGN PATENT DOCUMENTS

| | | |
|---|---|---|
| JP | 11-5599 | 2/1999 |
| JP | 2002366783 | 12/2002 |
| JP | 5273778 | 8/2013 |
| KR | 20040110605 | 12/2004 |
| KR | 1020100119916 | 11/2010 |
| WO | WO-0072160 | 11/2000 |
| WO | WO-2006116112 | 11/2006 |
| WO | WO-2009032946 | 3/2009 |

OTHER PUBLICATIONS

U.S. Appl. No. 11/366,966, filed Mar. 1, 2006, Tomasi et al.
"Dvdinsider: DVDPlay Debuts First U.S. Automated Entertainment Machine—AEM-," DVD News, Apr. 10, 2003, 2 pages.
Avery, Patrick, "Superstar Deployments," Self-Service World, Aug. 2007, 4 pages.
Beauprez, Jennifer; Maker of Automated DVD-Sales Kiosks Targets College Students; Denver Post; Dec. 6, 1999, 2 pages.
Declaration of Jens Horstmann Under 37 CFR 1.132 with Exhibits, filed in Affidavit-submitted prior to Mar. 15, 2013, U.S. Appl. No. 09/903,444, filed Oct. 31, 2007, 6 pages.
DVD-Play, Generation-3 Kiosk Flyer, Assumed published by Aug. 18, 2000, based on analysis of Internet Archive WaybackMachine, http://web.archive.org/web/20000818124625/http://www.dvdplay. net/how.asp and http://web.archive.org/web/20000818124432/ http://www.dvdplay.net/rentamovie.asp, 3 pages.
Ingram Relaunches DVD Rental Kiosk Program, Updates Software Package, Video Store, vol. 20, No. 5, Feb. 1, 1998, 2 pages.
Letter of Von Shows, CEO of Tejas Videos, Oct. 29, 2007, 1 page.
Phillips, Blockbuster Form DVD Video Rental Alliance in the U.S., AFX Europe, Sep. 9, 1998, 1 page.
Seitz, Patrick, "Self-Serve Movie Rental Kiosks a Surprise Hit with Consumers: DVD Vending Machines Find National Audience, Put Pinch on Retailers," Investor's Business Daily, May 31, 2007, 2 pages.
Slania, John T., "Dominick's, Jewel Touting DVD Vending; Rental Kiosks to Feature Per-night Fee on Movies," Crain's Chicago Business, Mar. 19, 2007, 2 pages.
U.S. Appl. No. 14/091,442, filed Nov. 27, 2013, Barber et al.
U.S. Appl. No. 14/974,261, filed Dec. 18, 2015, Tomasi, Philip J., et al.

* cited by examiner

WIRELESS COMMUNICATION FOR CONSUMER-OPERATED KIOSKS

TECHNICAL FIELD

The disclosed technology generally relates to vending machines and kiosk technology enabled with wireless telecommunication components for wirelessly communicating with mobile devices.

BACKGROUND

Consumer-operated kiosks implement technologies that allow customers to purchase, reload, rent, return and recycle various products, and to conduct a wide variety of transactions. Some exemplary kiosks include DVD rental kiosks; coin counting kiosks; kiosks for dispensing and reloading prepaid cards (gift cards, phone cards, etc.); kiosks for exchanging gift cards for cash and or other gift cards; fresh food vending kiosks; coffee kiosks; consumer-electronics vending kiosks; kiosks for dispensing beauty products, other types of consumer products, and or product samples; kiosks for vending event, travel, and or other types of tickets; etc.

For people with physical disabilities, accessibility to services and facilities is a primary issue. In 1990, the Americans with Disabilities Act became law and it provided comprehensive civil rights protection for people with disabilities. The act promotes equal opportunity of all people, whether they are disabled or not, to enjoy the same level of access to facilities. Advocates for the rights of people with disabilities focus their efforts on gaining acceptance in everyday activities and events from which they might have been excluded in the past. Visual disabilities, for example, affect people's ability to interact with modern day technologies that are often driven by a graphical user interfaces ("GUIs") that must be operated and navigated by users.

Figure 1:
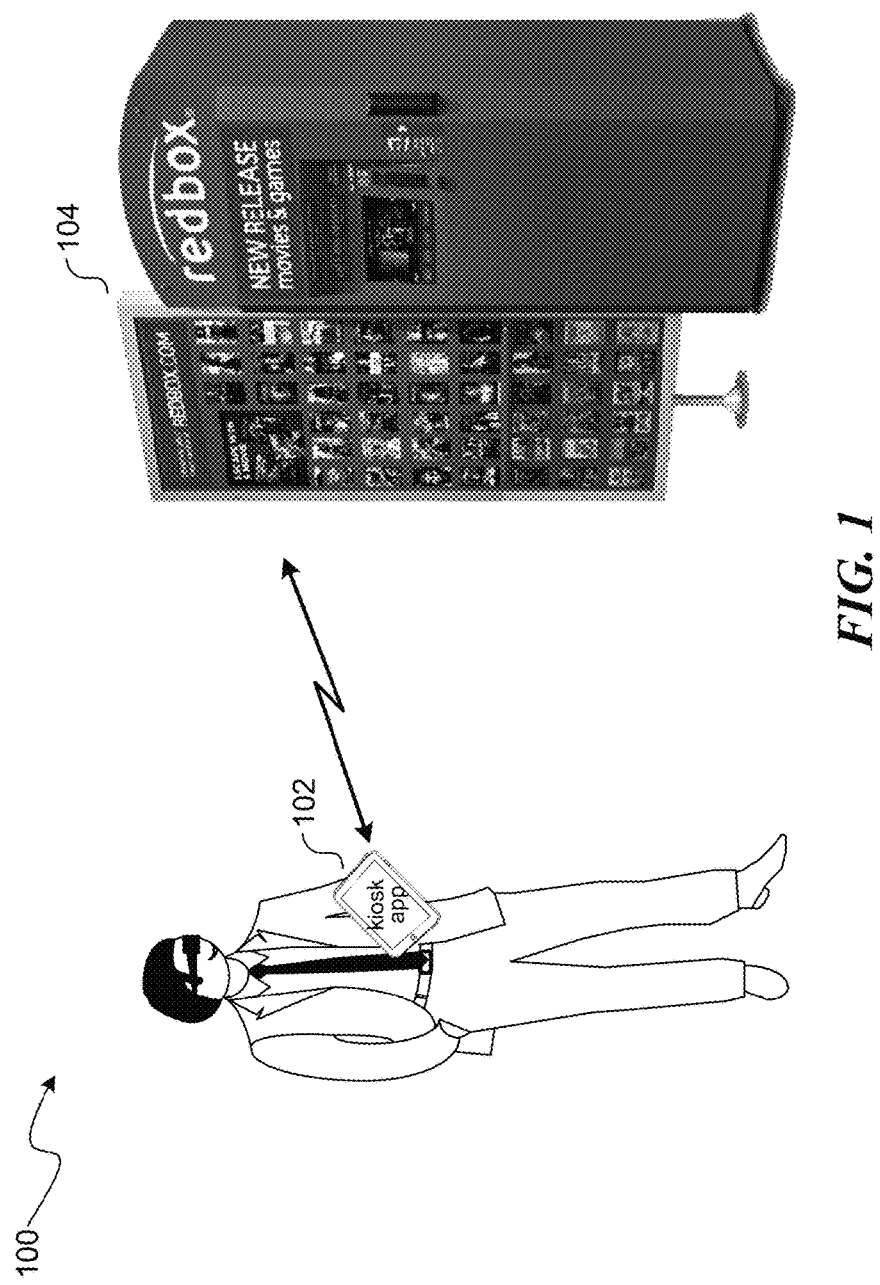
FIG. 1 is a schematic diagram of a basic and suitable wireless kiosk system that may employ aspects of the described technology.

Note: The headings provided herein are for convenience and do not necessarily affect the scope or interpretation of the described technology.

DETAILED DESCRIPTION

The inventors have recognized that current technology lacks an efficient design a method, system, and or device that accommodates visually impaired people's access to existing and emerging technologies such as vending kiosks and other traditional communicatively wired technologies. Furthermore, the inventors have recognized that conventional software and wireless specifications technology standards are often too complex or inefficient and fail to optimize the vending experience. To address these shortcomings, in some embodiments, the described technology is a universally accessible device, method, and or system that provides blind and or visually-impaired individuals with the ability to interact and or transact with a kiosk. In some embodiments, the universally accessible device, method, and or system ("technology") includes a wireless voice- and or GUI-controlled mobile device that facilitates transactions at a wireless-enabled consumer-operated kiosk ("kiosk"). The blind or visually impaired user can speak into the mobile device and or navigate a simplified GUI to request the kiosk to, among other things, rent a product, vend a product, return a product, or any other operation that could be performed at the kiosk without the aid of the described technology. Some embodiments of the described technology are discussed in the context of a kiosk configured to rent, vend, and return movies. However, the technology is generally applicable to other types of consumer-operated kiosks including, for example, coin counting kiosks; kiosks for dispensing and reloading prepaid cards (gift cards, phone cards, etc.); kiosks for exchanging gift cards for cash or other gift cards; DVD rental kiosks; fresh food vending kiosks; coffee kiosks; consumer-electronics vending kiosks; kiosks for dispensing beauty products, other types of products, and or product samples; kiosks for vending event, travel, and or other types of tickets; etc.

In various embodiments, if the user speaks a kiosk-related command (e.g., "rent movie X") into the mobile device, the mobile device wirelessly sends the command, via one or more messages, to the kiosk. The kiosk performs the command (e.g., rents movie X to the user) and sends one or more messages back to the mobile device that audibly (e.g., a voice, beep, tone, etc.), visually (e.g., a GUI with large indicators/buttons/lights, etc.), and or mechanically (e.g., vibration, an external movable apparatus, temperature change, etc.) informs the user of any further instructions/data/information related to the kiosk-related command. The mobile device and kiosk facilitate any additional user request(s) and or operation (e.g., payment) until the kiosk-related command(s) are completed, cancelled, suspended, etc.

In some embodiments, the wireless kiosk can be a wired kiosk modified with the described technology to enable wireless communication with the mobile device in addition to conventional forms of user inputs (e.g., touch screens, keys, etc.) The kiosk can be, for example, any type of vending-related kiosk such as a movie (e.g., DVD) rental kiosk, an audio/video product kiosk, a game rental kiosk, a coin counting kiosk, a food kiosk, a consumer product kiosk, a cellphone exchange kiosk, and or other product or service-related kiosk, etc. Such kiosks are disclosed in U.S. Pat. No. 5,564,546; U.S. Pat. No. 5,620,079; U.S. Pat. No. 7,028,827; U.S. Pat. No. 7,213,697; U.S. Pat. No. 7,113,929; U.S. Pat. No. 8,033,375; U.S. Pat. No. 5,564,546; U.S. Pat. No. 7,865,432; U.S. patent application Ser. No. 11/294,637; U.S. patent application Ser. No. 10/734,615; U.S. Pat. No. 7,014,108; U.S. patent application Ser. No. 13/286,971; U.S. patent application Ser. No. 13/183,391; U.S. patent application Ser. No. 13/671,299; U.S. patent application Ser. No. 13/745,665; U.S. patent application Ser. No. 13/554,832; U.S. patent application Ser. No. 13/304,254; U.S. patent application Ser. No. 13/367,129; U.S. patent application Ser. No. 13/728,905; U.S. patent application Ser. No. 13/842,368; U.S. patent application Ser. No. 13/790,674; U.S. patent application Ser. No. 13/802,070; U.S. Pat. No. 8,195,511; U.S. Pat. No. 8,423,404; U.S. Pat. No. 8,463,646; U.S. Pat. No. 7,881,965; U.S. Pat. No. 8,239,262; U.S. Pat. No. 8,200,533; and U.S. patent application Ser. No. 13/906,126, all of which are incorporated herein in their entireties by reference. As noted above, some of the examples herein focus on movie rental kiosks; however, the described technology is generally applicable to other products and or services.

In some embodiments, the mobile device can be a primarily software-based application ("APP") (e.g., a software application programmed to operate on a mobile phone operating system (iOS, Android, BlackBerry OS, etc.)) or a dedicated mobile device (e.g., a device having circuitry programmed (e.g., in ROM) to perform features of the described technology). In various embodiments, the mobile device is configured to operate with all or portions of traditional wireless hardware (e.g., Bluetooth, Wi-Fi, NFC, and RF); however, the APP or other features of the described technology may augment, modify, replace, or otherwise change any drivers, protocols, or software components used to operate the wireless hardware. This allows the described technology to use "off the shelf" wireless hardware technology (e.g., Bluetooth-configured circuitry) that is currently available in most mobile devices without the software overhead to comply with the often overly complex and inefficient wireless technology communication protocol standards.

In some embodiments, the described technology facilitates and or enables a visually impaired user to locate or "discover" one or more wireless kiosks. For example, the mobile device can broadcast or unicast a wireless discovery message requesting a response from any wireless kiosk within a selected or automatically-determined range. In various embodiments, each kiosk "listens" (i.e., are configured to receive discovery messages) for the request and responds with its kiosk identifier, which distinguishes the kiosk from other kiosks. In various embodiments, after the mobile device discovers a kiosk, the mobile device and or the kiosk establish a communicative session to facilitate, for example, rent, vend, and or return operations, based on one or more requests made at the mobile device. In some embodiments, the discovery process is performed separately from another kiosk operation (e.g., the discovery process is manually selected at the mobile device) or, in other embodiments, the discovery process it is automatically performed when a kiosk operation is selected at the mobile device. For example, when a rent-kiosk command is selected, the mobile device will first perform a discovery process, and then proceed with the rent operation.

In various embodiments, messages communicate the information between the mobile device and the kiosk. The messages can contain a command-type and payload. A command-type identifies the type of command that is requested by a user at the mobile device. For example, a rent message has a rent command-type (e.g., a binary identifier—1010) and a payload associated with the rent command-type (e.g., a movie identifier, a rental period, user information (e.g., rental history, recommended movies, payment data)). In some embodiments, the message is received by the kiosk and triggers the kiosk to perform a kiosk operation corresponding to the message contents (e.g., the kiosk rents a movie to the user). The kiosk can respond to the mobile device with its own message that is converted by the described technology into a format that is configured to inform the visually impaired user of a next action, instruction, task, or kiosk-related information.

In some embodiments the kiosk is a consumer-related kiosk that includes at least a processor, a storage medium; and a wireless communication device. The wireless communication device is configured to send a variety of types of wireless messages. In some embodiments, the wireless communication device is configured to receive a first wireless message for locating the kiosk; in response to receiving the first wireless message, send a second wireless message containing the kiosk's identifier; receive a third wireless message for requesting a user-selected inventory; in response to receiving the third wireless message, send a fourth wireless message that contains at least part of the user-selected inventory; and receive a fifth wireless message for renting an item indicated in the user-selected inventory. In some embodiments, the processor executes instructions for receiving payment for a kiosk transaction (e.g., renting a movie), verifying the payment information, and dispensing the item.

The terminology used in the description presented below is intended to be interpreted in its broadest reasonable manner, even though it is being used in conjunction with a Detailed Description of certain specific embodiments of the technology. Certain terms may even be emphasized below; however, any terminology intended to be interpreted in any restricted manner will be overtly and specifically defined as such in this Detailed Description section.

The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

FIG. 1 illustrates a wireless kiosk system 100 in accordance with an embodiment of the described technology. FIG. 1 shows a mobile device 102 and a wireless kiosk vending system kiosk 104. The kiosk 104, as described above, can vend movies (e.g., DVDs), music (e.g. CDs), games and or other products. For example, the mobile device 102 is a wireless computing device (e.g., phone, tablet, laptop, computerized glasses, etc.) configured to wirelessly communicate messages to and from the kiosk 104. In one embodiment, the mobile device 102 can be an iPhone, Android, Windows, or BlackBerry-enabled phone, etc. and an accessibility application (APP) that provides features of the described technology installed on the mobile device 102. In another embodiment, the App can be hardwired into a mobile device dedicated to performing vending operations. In some embodiments, the mobile device 102 has a touch screen for manipulating the App; however, the described technology can be implemented with hardware- and or software-based features.

Aspects of the wireless kiosk system 100 may be practiced in a variety of computing environments. For example, FIG. 2 and the following discussion provide a brief, general description of a suitable computing 200 in which aspects of the described technology, such as the mobile device 102 and or the wireless kiosk 104, can be implemented. Although not required, aspects of the technology may be described herein in the general context of computer-executable instructions, such as routines executed by a general or special purpose data processing device (e.g., a mobile client, kiosk, server, thin-client, or client computer). Aspects of the technology described herein may be stored or distributed on tangible computer-readable media, including magnetically or optically readable computer discs, hardwired or preprogrammed chips (e.g., EEPROM semiconductor chips), nanotechnology memory, biological memory, or other data storage media. Alternatively, computer implemented instructions, data structures, screen displays, and other data related to the technology may be distributed over the Internet or over other networks (including wireless networks) on a propagated signal on a propagation medium (e.g., electromagnetic wave(s), sound wave(s), etc.) over a period of time. In some implementations, the data may be provided on any analog or digital network (packet switched, circuit switched, or other scheme).

The described technology can also be practiced in distributed computing environments, where tasks or components are performed by remote processing devices, which are linked through a communication network, such as a Personal Area Network ("PAN"), Local Area Network ("LAN"), Wide Area Network ("WAN"), Near Field Communication ("NFC"), Mobile networks (e.g., floating networks based on devices at least partially residing in the atmosphere—stratosphere, troposphere, mesosphere), and or the Internet. For simplicity, the described technology describes Bluetooth technology as an example communication network. In a distributed computing environment, program components or sub-routines may be located in both local and remote memory storage devices. Those skilled in the relevant art will recognize that portions of the described technology may reside on a server computer (e.g., kiosk), while corresponding portions reside on a client computer (e.g., a thin-client, or the APP). Data structures and transmission of data particular to aspects of the technology are also encompassed within the scope of the described technology.

Figure 2:
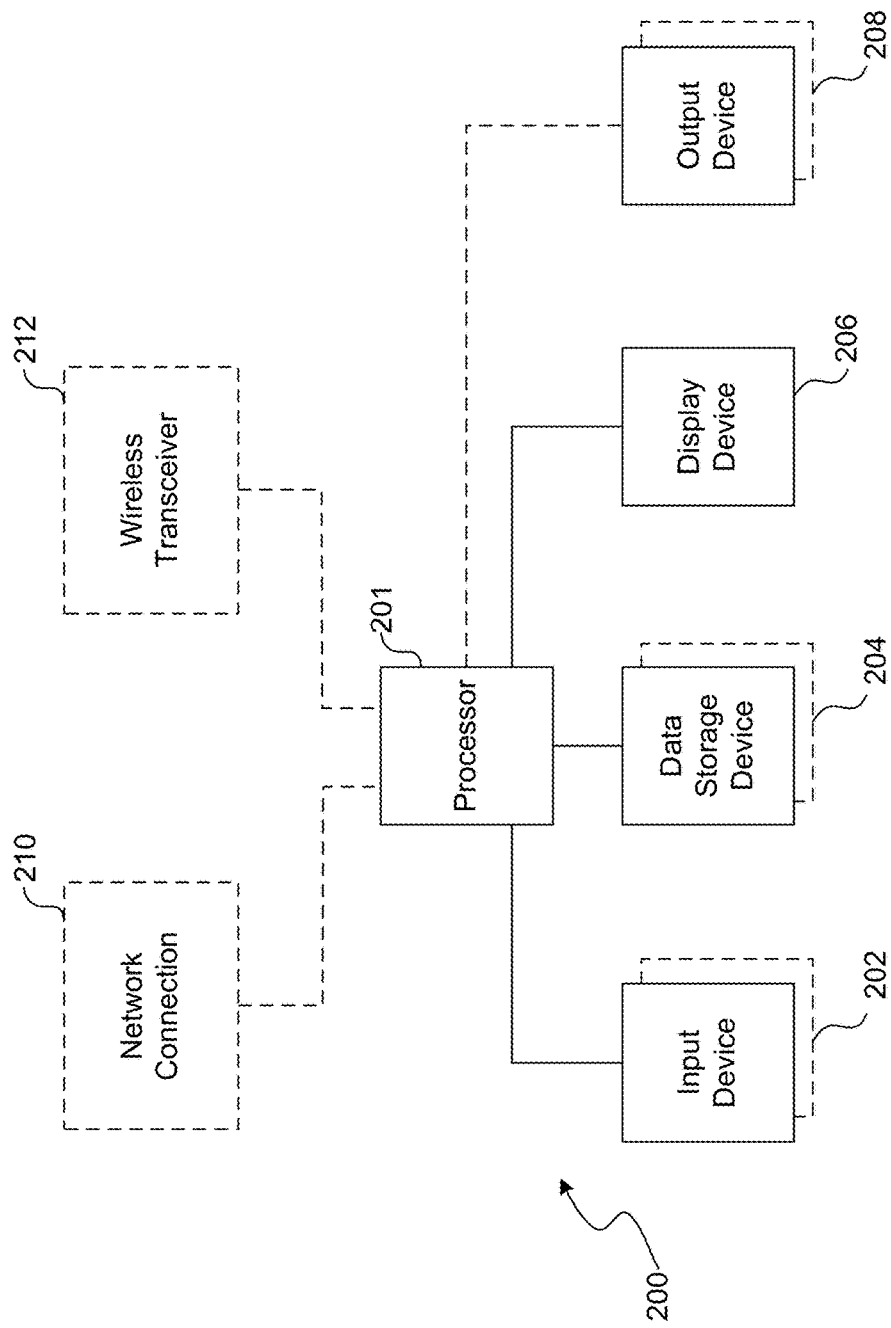
FIG. 2 is a schematic diagram of a basic and suitable computer that may employ aspects of the described technology.

Referring to FIG. 2, the described technology can employ a computer 200, such as a personal computer, workstation, tablet, smart phone, or smart-glasses having one or more processors 201 coupled to one or more user input device means 202. The input devices 202 may include a microphone, keyboard, keypad, touch screen, accelerometer, touch pad, and or a pointing device, such as a mouse. Other input devices are possible, such as a joystick, pen, game pad, scanner, digital camera, video camera (e.g., for face recognition), etc. The computer is also coupled to at least one output device, such as a display device 206, and one or more optional additional output devices 208 (e.g., printer, plotter, speakers, touchscreen, touch pad, vibration device tactile or olfactory output devices, etc.). The computer may be coupled to external computers, such as via an optional network connection 210, a wireless communication component 212, or both. In some embodiments, the wireless communication component 212 is wireless hardware, such as RF antenna circuitry, and or software (e.g., Bluetooth, IEEE 802 technology, NFC, WiMax, Wi-Fi, LAN, WAN, Mobile network) for wirelessly communicating messages 330 to a wireless communication component 212 of kiosk 104.

The data storage devices 204 may include any type of computer-readable media that can store data accessible by the computer 200, such as magnetic hard and floppy disk drives, optical disk drives, magnetic cassettes, tape drives, flash memory cards, digital versatile disks (DVDs), Bernoulli cartridges, RAMs, ROMs, smart cards, etc. Indeed, any medium for storing or transmitting computer-readable instructions and data may be employed, including a connection port to or node on a network, such as a PAN, LAN, WAN, or the Internet (not shown in FIG. 2).

Figure 3:
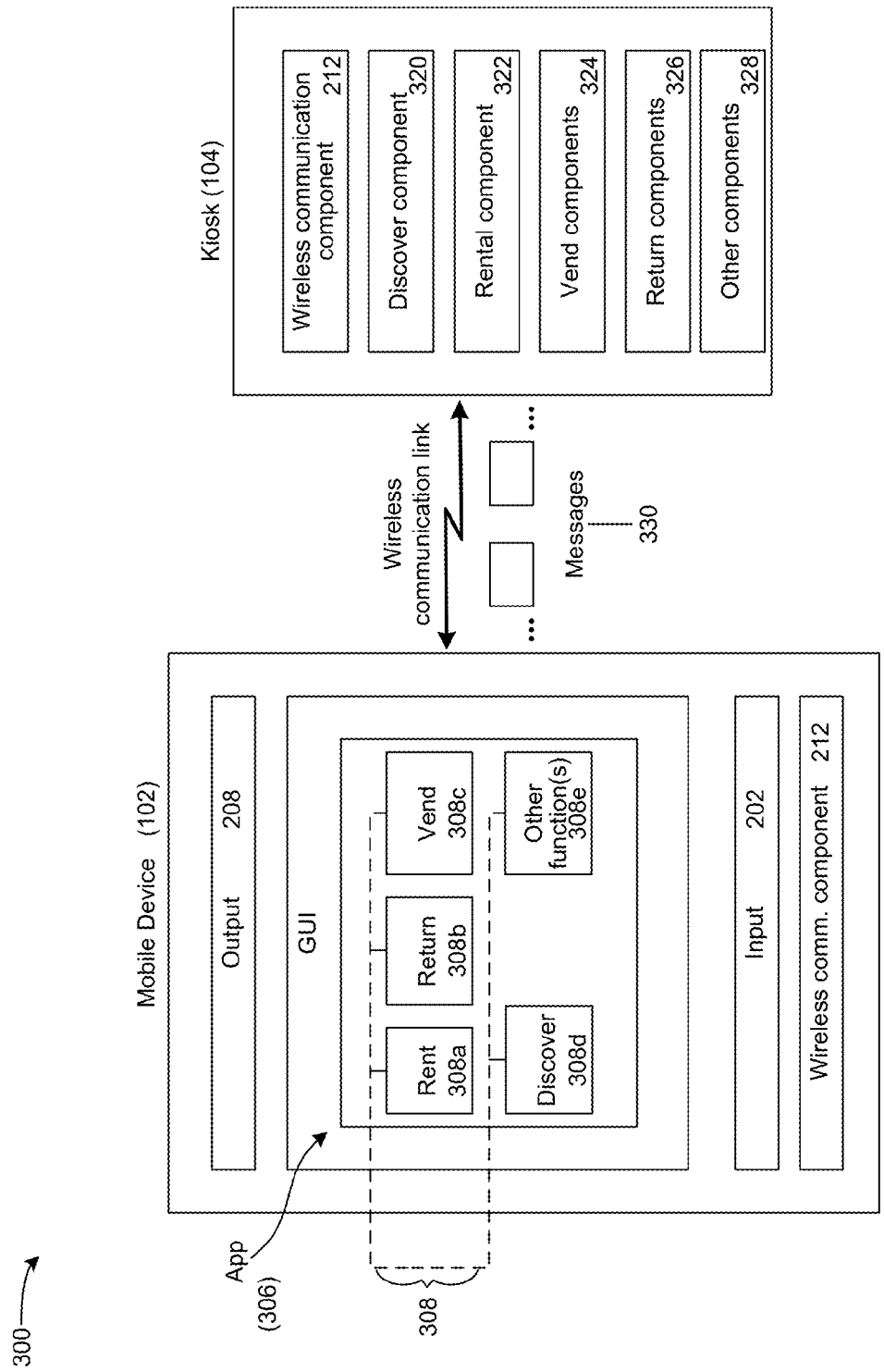
FIG. 3 is a schematic diagram illustrating suitable features of a wireless kiosk and a wireless mobile device in which aspects of the described technology may operate in a networked computer environment.

FIG. 3 is a schematic diagram 300 illustrating simple, yet suitable features of the wireless kiosk 104 and wireless mobile device 102 in which aspects of the described technology may operate in a computer network, as noted above. In the illustrated embodiment, the mobile device 102 can include one or more of the following components: input 204, APP 306, virtual and or physical transaction buttons 308a-308e ("buttons"), and a wireless communication component 212. As noted above, the input 204 may be any number of inputs devices, such as a microphone. In some embodiments, the APP 306 is software such as drivers, graphical interface/design/processing, voice recognition routines, text-to-speech conversion algorithms, speech-to-text conversion algorithms, and or other operations used to facilitate features of the described technology. In some embodiments, transaction buttons 308a-308e are used by a user to initiate a kiosk-related operation. For example, the rent button 308a can be selected (e.g., touched) to facilitate renting, for example, a DVD/movie via the mobile device 102 from the kiosk 104. The return button 308b can be selected to facilitate returning the DVD/movie to the kiosk 104. The vend transaction button 308c can be selected to facilitate vending, for example, the DVD/movie to the user at the kiosk 104. Other transaction buttons 308e can optionally be displayed by the App 306 based on other features that are accessible via, for example, a touch screen and the kiosk 104. As note (or discussed, or described) below, kiosk discovery can be performed automatically in conjunction with performance of a selected consumer, via one or more of the transaction buttons 308a-308c. Alternatively, kiosk discovery can be initiated manually as a separate function with the mobile device 102. For example, a user can select a dedicated discovery button 308d to facilitate locating a nearby kiosk 104 in range of the mobile device 102.

The Kiosk 104 includes a wireless communication component 212, a discovery component 320, a rental component 322, a vend component 324, and a return component 326. In some embodiments, the wireless communication component 212 is used, to, transmit the messages 330 to the wireless communication component 212 in the mobile device 102. Depending on the type of message received (as explained in further detail below) the kiosk 104 is configured to perform kiosk operations corresponding to the message type of a message received from mobile device 102. For example, when a discovery message is sent to the kiosk, a discover component 320 is configured to process operations corresponding to discovering a kiosk 104 (as explained below). In some embodiments, when a rent message is sent to the kiosk 104, a rental component 322 is configured to process operations corresponding to renting a movie. Similarly, when a vend message is sent to the kiosk 104, a vend component 324 is configured to process operations corresponding to vending a movie, and when a return message is sent to the kiosk 104, a return component 326 is configured to process operations corresponding to returning a movie. Other components 328 are optionally available to support other features available at a traditional kiosk. Features of components 320-328 are described in further detail below in reference to FIGS. 5-12.

Figure 4:
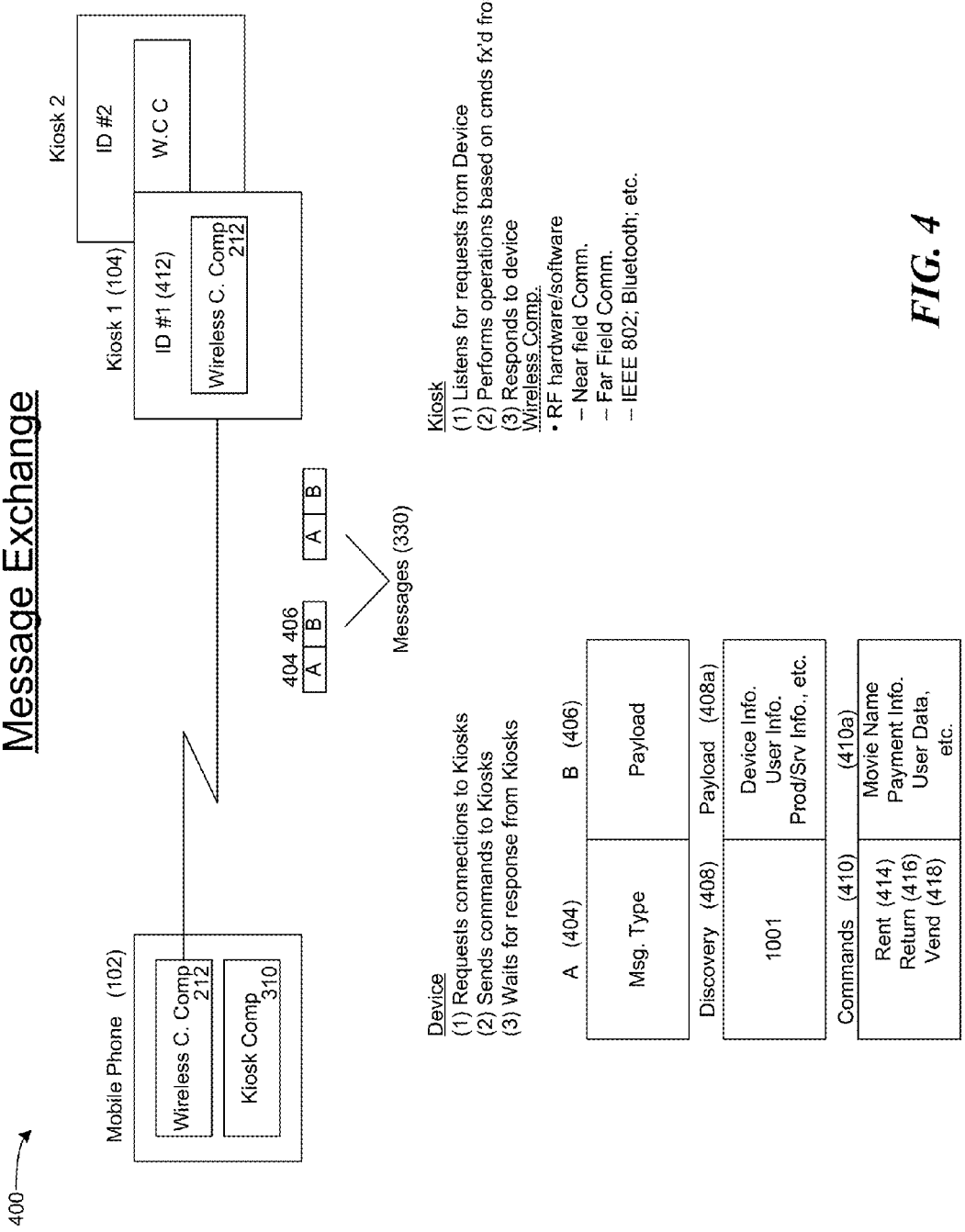
FIG. 4 is a schematic diagram of a basic and suitable message exchange that may employ aspects of the described technology.

FIG. 4 is a schematic diagram 400 of a basic and suitable message exchange process that may employ aspects of the described technology. In some embodiments, the mobile device 102 transmits messages 330 via the wireless communication component 212 to request connections to the kiosk 104 and to send kiosk-related commands to the kiosk 104. The kiosk 104 listens for messages from the wireless communication component 212 of the mobile device 102, and performs kiosk-related operations (e.g., session setup; renting, vending, and returning a movie) based on contents of the received message(s). The kiosk 104 responds to the mobile device 102 messages with instructions, information requests, session control data (e.g., sending a discovery reply message having a kiosk ID, such as ID#1 (412)), etc. In some embodiments, Message 330 is a communication packet or other type of data transport used to facilitate the information exchange between the mobile device 102 and the kiosk 104. The message 330 can include two or more portions, 'A' 404 and 'B' 406. In some embodiments, a first message portion 'A' 404 contains, a message type 404 to identify the nature of the message (e.g., what the information (i.e., payload) in the message pertains to), such as a feature associated with buttons 320-328. In some embodiments, the message type 404 is a binary indicator unique to a particular message type. Message payload 'B' 406 can correspond to information related to the message type 404. For example, a discovery message type 408 indicates that a payload 408a relates to kiosk discovery (explained below). The discovery message type 408 can be a binary identifier, such as '1001', to distinguish the discovery message from other messages, such as a rent, vend, or return message. The payload 408a may consist of information relevant to features of kiosk discovery (e.g., data broadcast to listening kiosks, device information, user information, kiosk ID distribution or association, last successful discovered kiosk, next-best kiosk, connectivity information (strength of wireless signal), etc. In other embodiments, a rent message, a return message, and a vending message (330) each include a corresponding message type 410 (e.g., rent 414, return 416, vend 418, etc.) and a payload 410a (e.g., movie names, payment information, user data, email information, request for an electronic receipt, subscription information, award information, information requesting user feedback and or follow-up).

Figure 5:
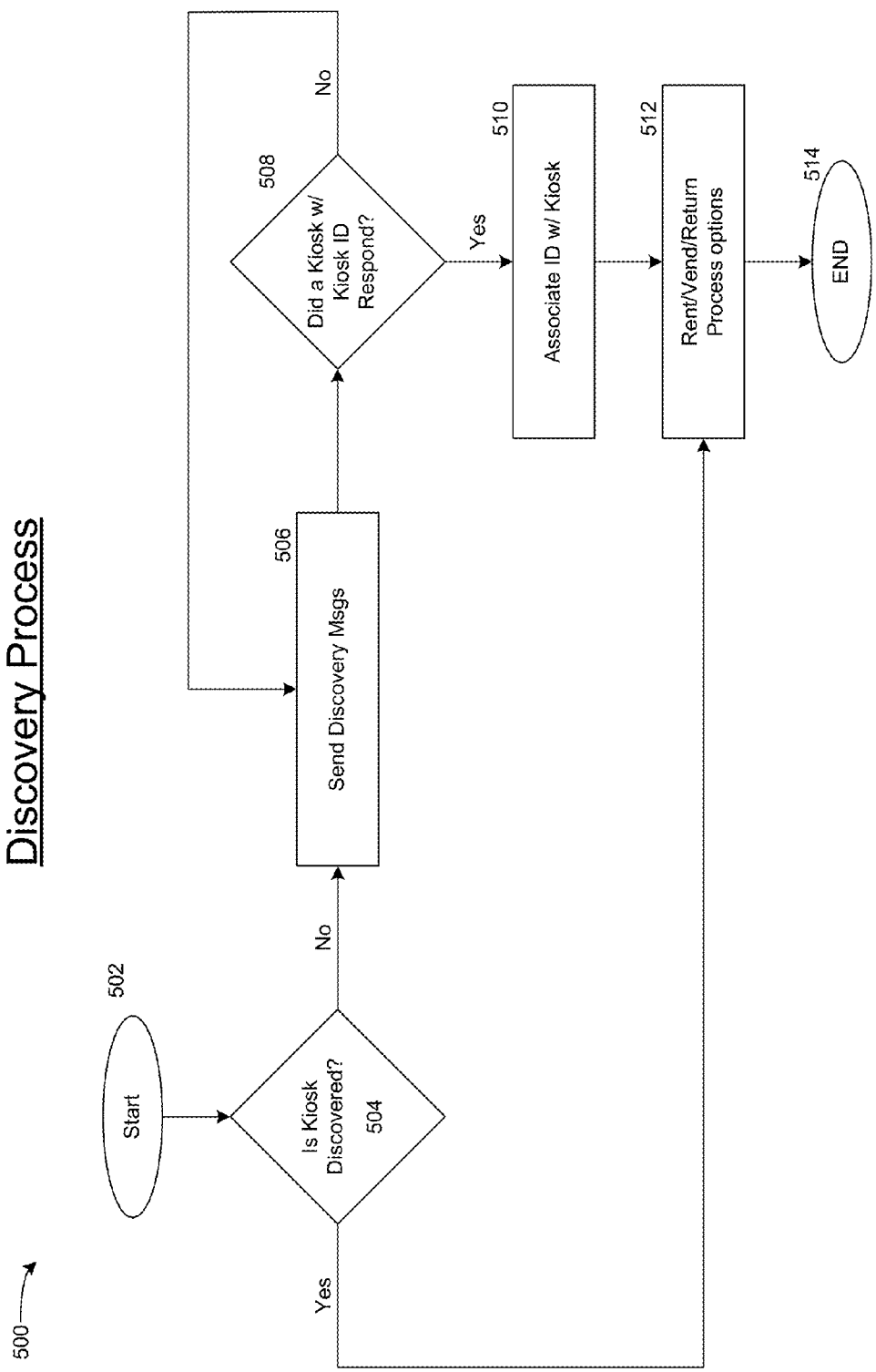
FIG. 5 is a flow diagram illustrating operation of a possible implementation of an embodiment for a mobile device's discovery a kiosk.

FIG. 5 is a flow diagram illustrating a process 500 for locating or "discovering" a kiosk. The discovery process starts at 502. At decision 504, if the mobile device 102 has discovered the kiosk 104 (as explained above), then at 512 the mobile device 102 and kiosk 104 can exchange messages 330, such as rent, vend, or return messages. Otherwise, if at decision 504 the mobile device 102 did not discover the kiosk 104, then at 506, the mobile device 102 sends discovery message 408 and a payload 408a for discovering available kiosks 104 that are in the proximity of the mobile device 102. If a kiosk 104 is in range and is listening for discovery messages 408-408a, then at 508 the kiosk 104 responds with discovery information, such as a message including its kiosk ID 412. At 510, mobile device 102 associates the kiosk's id 412 as a kiosk 104 that is available for messages 330 for performing kiosk-related commands (e.g., rent, vend, or return a product). At 512, the mobile device 102 and kiosk 104 can exchange messages 330, such as rent, vend, or return messages. At 514, the process ends.

Figure 6:
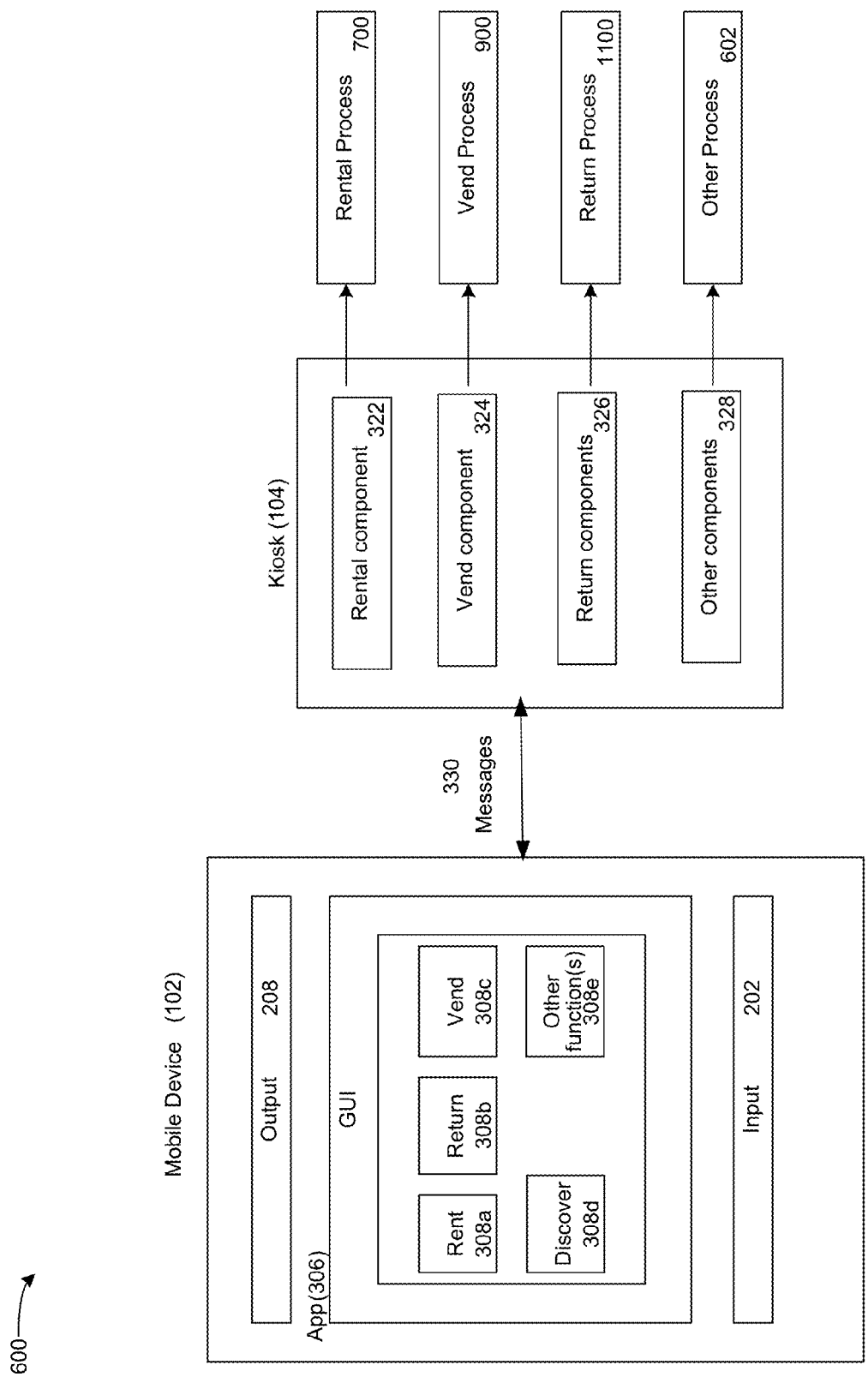
FIG. 6 is a flow diagram illustrating message communication for performing kiosk operations that may employ aspects of the described technology.

FIG. 6 is a diagram 600 illustrating aspects of message communication for performing kiosk operations that may employ aspects of the described technology. In some embodiments, when a user makes a selection at the mobile device 102, (e.g., via buttons 308a-308e, a voice command, or other input means 202) a message 330 corresponding to the selection is to the kiosk 104. When the message 330 is received by the kiosk 104, the message 330 can trigger an operation corresponding to the message type 404 of the received message 330. For example, if a rental command 414 is selected at the mobile device 102 (e.g. selection of the button 308a, a voice command, or other input 202), a message 330 having a rental message type 404 and payload 406 is sent for delivery to the kiosk 104. In some embodiments, receipt of the message 330 causes the rental component 322 to trigger a rental process 700, as are described in further detail in below in reference to FIGS. 7-8. Similarly, if a vend command 418 is selected (e.g. by selection of a button 308c, a voice command, or other input 204) a corresponding message 330 having a vend message type 404 and payload 406, is sent for delivery to kiosk 104. In some embodiments, the vend component 324, triggers a vend process 900, as described in further detail below in reference to FIGS. 9-10. In some embodiments, the return component 326 triggers a return process 1100 based on the return message 330, as described in further detail below in reference to FIGS. 11-12. Other commands received at the kiosk 104 from the mobile device 102 can trigger other components 328 to trigger other processes 602, such as exchange a cellphone.

Figure 7:
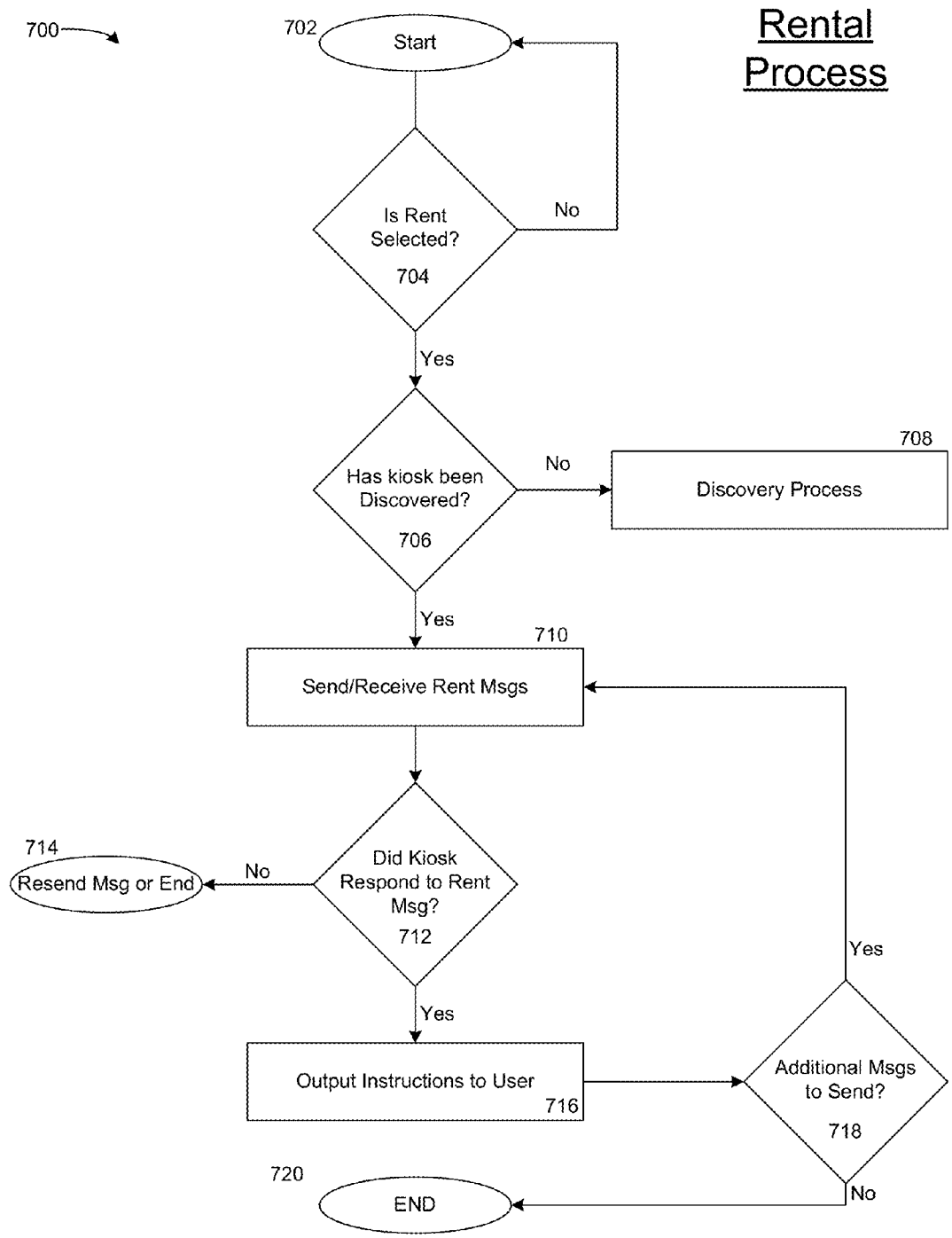
FIG. 7 is a flow diagram illustrating rental operation processes that may employ aspects of the described technology.

FIG. 7 is a flow diagram illustrating an exemplary rental operation process 700 that may employ aspects of the described technology. The rental process starts at 702 where a user may optionally input a rental selection, via the mobile device 102 (e.g., by speaking a selection, depressing a button 308a, or by another input 204). If a rent operation is not selected at decision 704, then the flow 700 returns to 702. If a rent operation is selected, then at decision 704 the mobile device 102 can determine whether or not the kiosk 104 has been discovered (as noted above). If not, then the process 700 will proceed to the discovery process, at 708, as noted in FIG. 5. If the kiosk 104 is discovered, then at 710 the mobile device 102 exchanges the rent messages to and from the kiosk 104. At 712, if the kiosk 104 does not respond to the rent message, then at 714 the rent message may be resent from the mobile device 102 (e.g., based on a timer) or the process 700 may end. However, if the kiosk 104 responds to the rent messages, then at 716 instructions, data, and or other information contained in the rent messages are presented (e.g., spoken to the user) via the output means 208. If there are additional messages 330 to send from the mobile device 102 to the kiosk 104 (e.g., the user may want to enter additional information corresponding to a rent transaction, payment information, general user data, email information, award information, request for an electronic receipt, subscription information, information requesting user feedback and or follow-up) then at 718 the process 700 returns to 710. Otherwise the process ends at 720.

Figure 8:
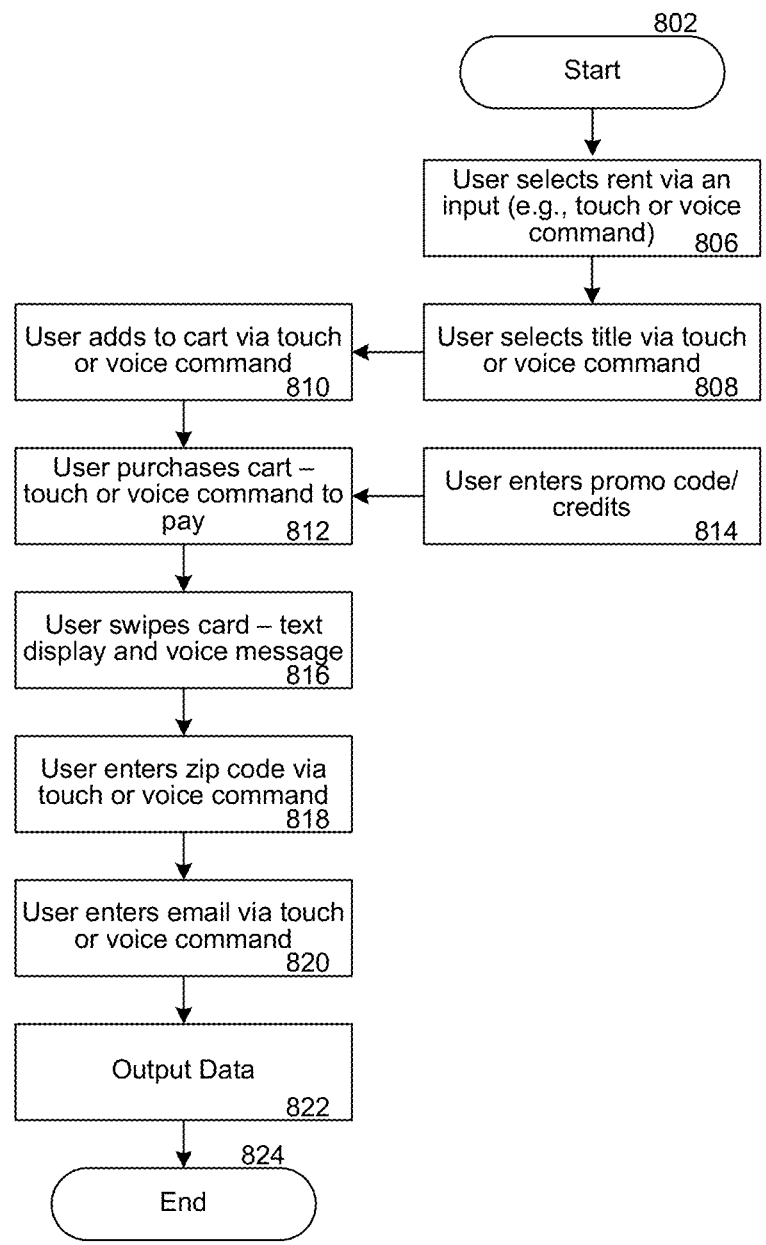
FIG. 8 is a flow diagram illustrating rental instruction messages that may employ aspects of the described technology.

FIG. 8 is a flow diagram illustrating exemplary rental instruction messages that may employ aspects of the described technology. In some embodiments, instructions, data, and other information include any information that is available at a traditional kiosk (i.e., where a user directly interacts with the kiosk). Various instructions, data, and other information can be included as payload 406 in a rental message, for example. The following are examples of instructions, and or other information and are not meant to be inclusive. The flow diagram assumes that the kiosk 104 is discovered (as noted above) and that a rental option is selected, as described in further detail above in reference to FIG. 7. (See, step 806.) In some embodiments, the user selects at 808 rental information such as a title, movie name, a game, etc. At 810 the user can add, via an input means 202, a product to rent (e.g., a movie) to a shopping cart of other products available at the kiosk 104. At 812 the user can purchase the product(s) via one or more of the input means 202 (e.g., by swiping or speaking credit card information into the mobile device 102). At 814, various other information, such as promotions, subscription information, award information, email information, requests for receipts, opt-in information (e.g., opting in to receiving marketing data), and or rental credits can be entered, if applicable to the rental transaction. In some embodiments, user information (e.g., a user profile and or credit card information) is stored in a physical location accessible to the kiosk 104 so that the user does not have to input credit card, cash, or any other type of personal information to complete a rental transaction. At 818, various authentication and security mechanisms may be implemented to protect user confidentiality. For example, at 818, the user can be requested to enter username/password or a zip code via input means 202. In some embodiments, the user at 820 enters an email address to receive additional information, such as a receipt 820 of the completed rental process. The mobile device 102 at 822 can use the output means 208 to, for example, display and or speak rental-related instructions to the user (e.g., regarding availability of a movie, rental duration), etc. At 824 the process ends.

Figure 9:
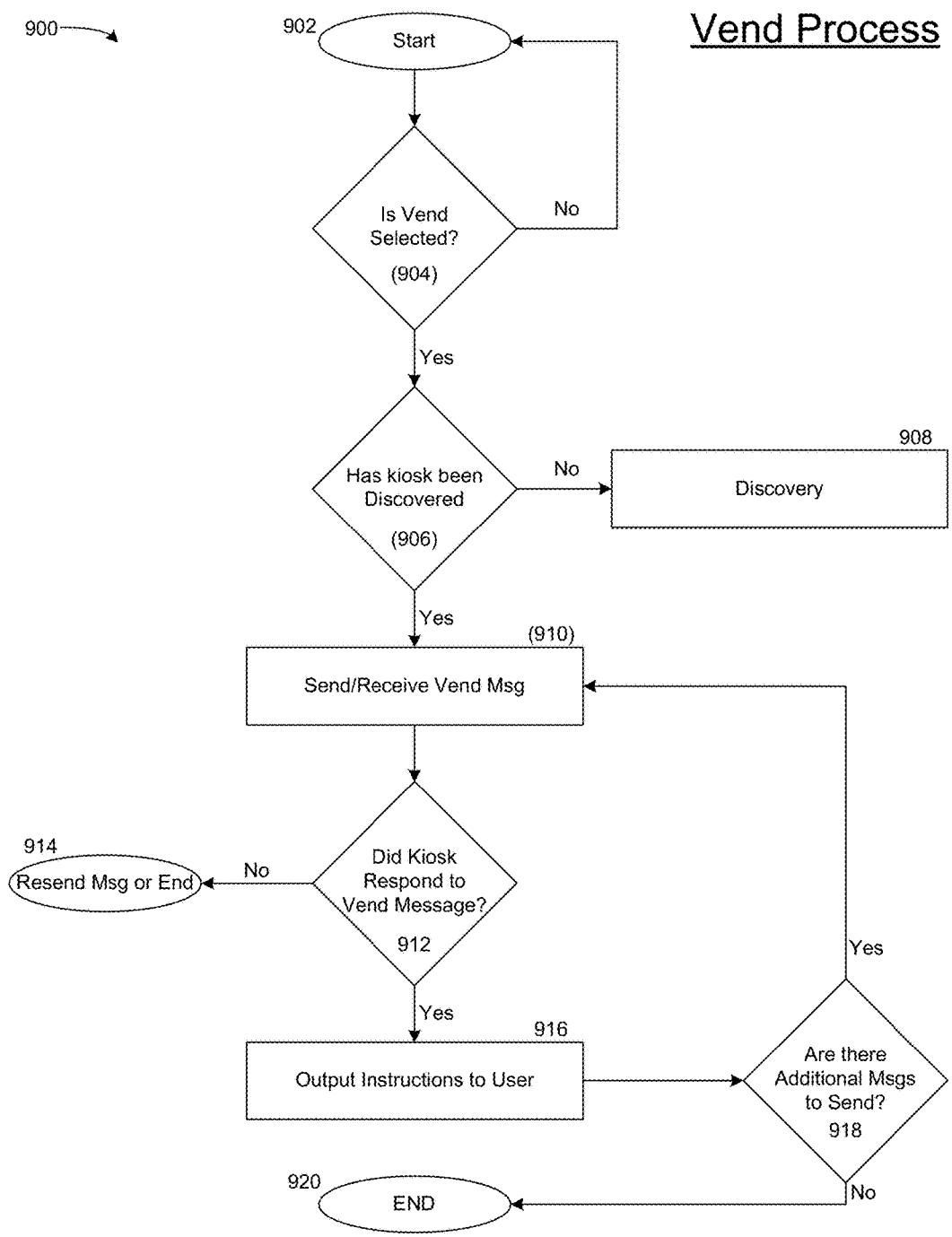
FIG. 9 is a flow diagram illustrating vending operation processes that may employ aspects of the described technology.

FIG. 9 is a flow diagram similar to flow diagram of FIG. 7; however FIG. 9 illustrates a vending operation process (not a rental operation process) that may employ aspects of the described technology. The vending process starts at 902 where a user may optionally input a vending selection, via the mobile device 102 (e.g., by speaking a selection, depressing a button 308b, or by another input 204). If a vending operation is not selected at decision 904, then the flow 900 returns to 902. If a vending operation is selected, then at decision 904 the mobile device 102 can determine whether or not the kiosk 104 has been discovered (as noted above). If not, then the process 900 will proceed to the discovery process, at 908, as noted in FIG. 5. If the kiosk 104 is discovered, then at 910 the mobile device 102 exchanges the vending messages to and from the kiosk 104. At 912, if the kiosk 104 does not respond to the vending message, then at 914 the vending message may be resent from the mobile device 102 (e.g., based on a timer) or the process 900 may end. However, if the kiosk 104 responds to the vending messages, then at 916 instructions, data, and or other information contained in the vending messages are presented (e.g., spoken to the user) via the output means 208. If there are additional messages 330 to send from the mobile device 102 to the kiosk 104 (e.g., the user may want to enter additional information corresponding to a vending transaction, payment information, general user data, email information, award information, request for an electronic receipt, subscription information, information requesting user feedback and or follow-up) then at 918 the process 900 returns to 910. Otherwise the process ends at 920.

Figure 10:
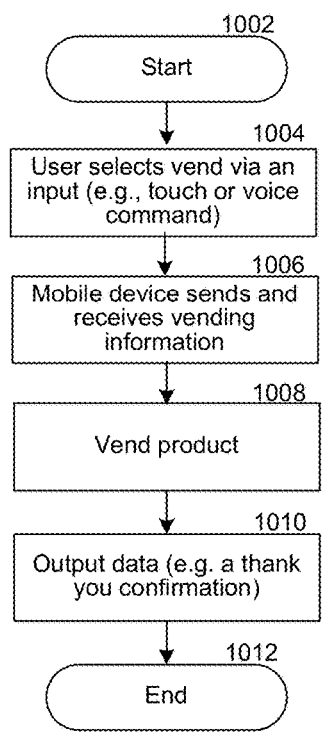
FIG. 10 is a flow diagram illustrating vending instruction messages that may employ aspects of the described technology.

FIG. 10 is a flow diagram similar to the flow diagram of FIG. 8. FIG. 10 illustrates exemplary vending-related messages that may employ aspects of the described technology. Various instructions, data, and other information are included as payload 406 in a vending message type 404. The following are examples and are not meant to be inclusive. The process 1000 assumes that the kiosk 104 is discovered (as noted above) and that a vending option is selected, as described in further detail above in reference to FIG. 9. (See, sup. 1004.) At 1002 the process starts. In some embodiments, at 1004 the user selects, via an input means 202, vending information such as a movie name, etc. At 1006, the mobile device 102 sends vending-related messages 330 to the kiosk 104 that request vending of a product (e.g., a movie). At 1006, the kiosk 104 can reply to the mobile device 102 with instructions, data, and information relating to vending (e.g., where on the kiosk to find the vended product). At 1008, the product is vended and at 1010 additional information (e.g., a thank you message and or vending confirmation) can be sent to an output means 208 of the mobile device 102. The process ends at 1012.

Figure 11:
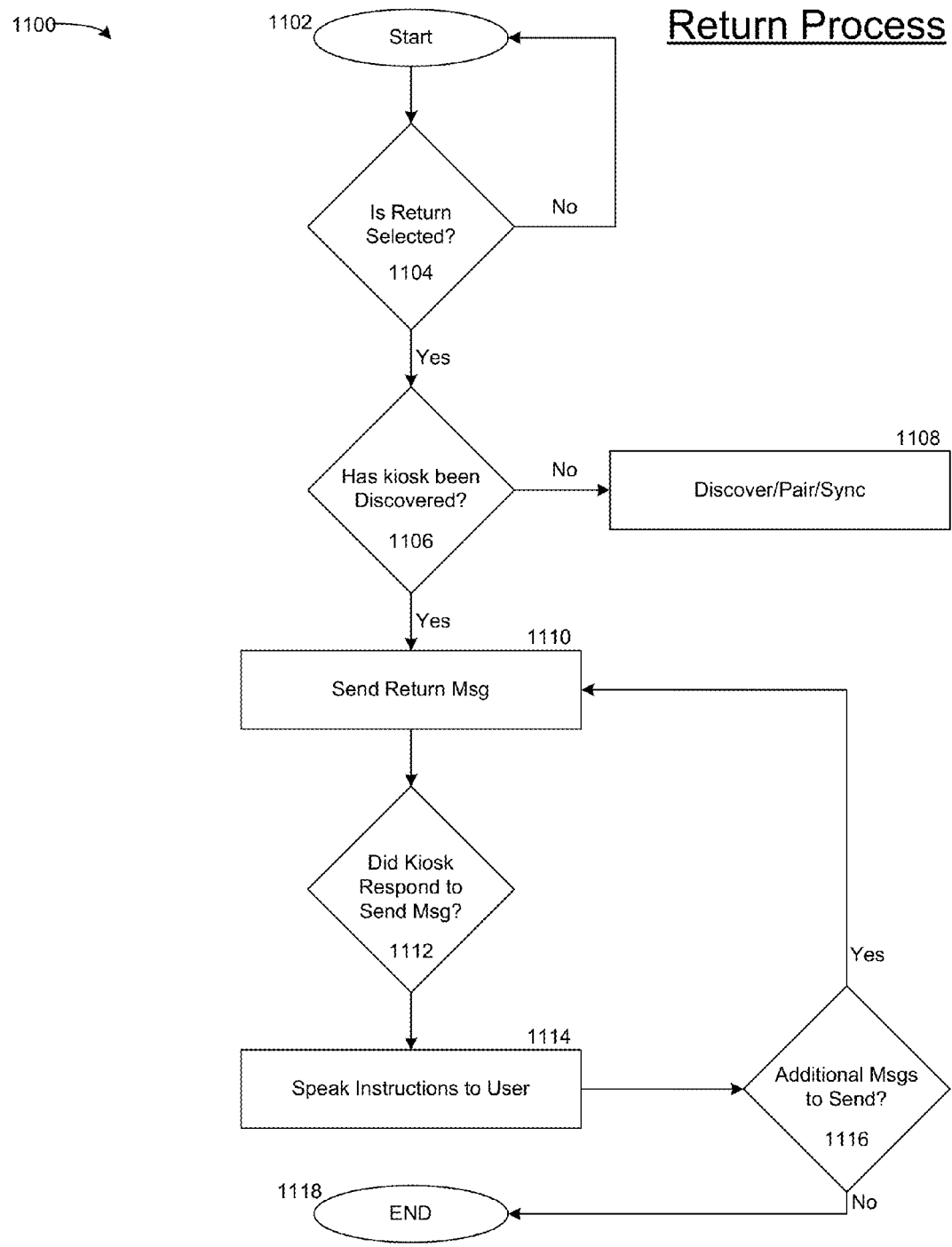
FIG. 11 is a flow diagram illustrating return processes that may employ aspects of the described technology.

FIG. 11 is a flow diagram 1100 is similar to the flow diagrams 700 and 900 of the flow diagrams of FIGS. 7 and 9; however FIG. 11 illustrates a return operation process that may employ aspects of the described technology. The return process starts at 1102 where a user may optionally input a return selection, via the mobile device 102 (e.g., by speaking a selection, depressing a button 308c, or by another input 204). If a return operation is not selected at decision 1104, then the flow 1100 returns to 1102. If a return operation is selected, then at decision 1104 the mobile device 102 can determine whether or not the kiosk 104 has been discovered (as noted above). If not, then the process 1100 will proceed to the discovery process, at 1108, as noted in FIG. 5. If the kiosk 104 is discovered, then at 1110 the mobile device 102 exchanges the return messages to and from the kiosk 104. At 1112, if the kiosk 104 does not respond to the return message, then at 1114 the return message may be resent from the mobile device 102 (e.g., based on a timer) or the process 1100 may end. However, if the kiosk 104 responds to the return messages, then at 1116 instructions, data, and or other information contained in the return messages are presented (e.g., spoken to the user) via the output means 208. If there are additional messages 330 to send from the mobile device 102 to the kiosk 104 (e.g., the user may want to enter additional information corresponding to a return transaction, payment information, general user data, email information, award information, request for an electronic receipt, subscription information, information requesting user feedback and or follow-up) then at 1118 the process 1100 returns to 1110. Otherwise the process ends at 1120.

Figure 12:
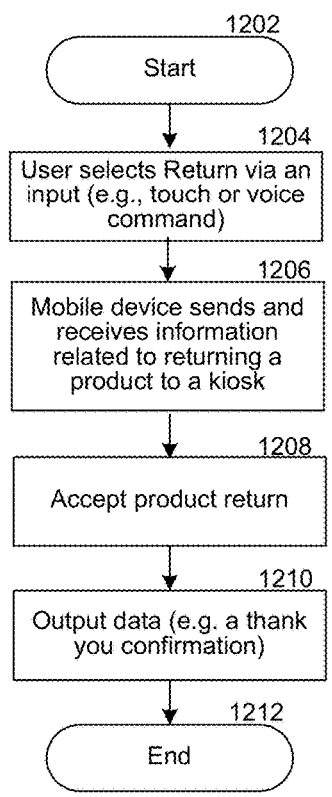
FIG. 12 is a flow diagram illustrating return instruction messages that may employ aspects of the described technology.

FIG. 12 is a flow diagram similar to FIG. 10. FIG. 12 illustrates exemplary return-related messages that may employ aspects of the described technology. Various instructions, data, and other information are included as payload 406 in a return message type 404. The following are examples and are not meant to be inclusive. The process 1200 assumes that the kiosk 104 is discovered (as noted above) and that a return option is selected, as described in further detail above in reference to FIG. 11. (See, sup. 1204.) At 1202 the process starts. In some embodiments, at 1204 the user selects, via an input means 202, return information such as a movie name to return, etc. At 1206, the mobile device 102 sends return-related messages 330 to the kiosk 104 that requests return of a product (e.g., a movie). At 1206, the kiosk 104 can reply to the mobile device 102 with instructions, data, and information relating to returning a product (e.g., where on the kiosk to return the product). At 1208, the product is returned and at 1210 additional information (e.g., a thank you message and or return confirmation) can be sent to an output means 208 of the mobile device 102. The process ends at 1212.

Further details on at least one embodiment of the described technology are provided in the documents appended herewith.

In general, the Detailed Description of embodiments of the described technology is not intended to be exhaustive or to limit the technology to the precise form disclosed above. While specific embodiments of, and examples for, the technology are described above for illustrative purposes, various equivalent modifications are possible within the scope of the described technology, as those skilled in the relevant art will recognize. For example, while processes, schematics, and or components are presented in a given order, alternative embodiments may perform routines having steps, or employ systems having schematics, in a different order, and some processes or schematics may be deleted, moved, added, subdivided, combined, and or modified. Each of these processes, schematics, and or components may be implemented in a variety of different ways (e.g., hardware, software, and combinations of each). Also, while processes, schematics, and or components are at times shown as being performed in a series, these processes, schematics, and or components may instead be performed in parallel, or may be performed at different times.

The teachings of the described technology provided herein can be applied to other systems, not necessarily the system described herein. The elements and acts of the various embodiments described herein can be combined to provide further embodiments.

These and other changes can be made to the described technology in light of the above Detailed Description. While the above description details certain embodiments of the technology and describes the best mode contemplated, no matter how detailed the above appears in text, the described technology can be practiced in many ways. Details of the described technology may vary considerably in its implementation details, while still being encompassed by the technology disclosed herein. As noted above, particular terminology used when describing certain features or aspects of the described technology should not be taken to imply that the terminology is being redefined herein to be restricted to any specific characteristics, features, or aspects of the technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

We claim:

1. A computer implemented method for wirelessly communicating with a consumer-operated kiosk, the computer implemented method comprising:

initiating a commercial operation via a mobile device of a user by sending a first wireless message from the mobile device to determine a location of a kiosk in range of the user, wherein the first wireless message is a discovery message configured to locate a kiosk;

in response to sending the first wireless message, receiving a first wireless reply message, wherein the first wireless reply message identifies a located kiosk;

in response to receiving the identification of the located kiosk, sending a second wireless message from the mobile device to the located kiosk, wherein the second wireless message is configured to initiate execution of the commercial operation by the located kiosk; and in response to sending the second wireless message, receiving a second wireless reply message from the located kiosk, wherein the second wireless reply message indicates a status of the commercial operation.

2. The computer implemented method of claim 1 wherein sending the first wireless message includes transmitting the first wireless message to one or more kiosks within range of the mobile device, and wherein receiving the first wireless reply message includes receiving the first wireless reply message from the one or more kiosks.

3. The computer implemented method of claim 1, further comprising:

generating the second wireless message in response to a voice command.

4. The computer implemented method of claim 1 wherein sending the second wireless message from the mobile device includes sending a request to obtain a product from the located kiosk.

5. The computer implemented method of claim 1 wherein sending the second wireless message from the mobile device includes sending a request for at least one of renting a product from the located kiosk, vending a product from the located kiosk, and returning a product to the located kiosk.

6. The computer implemented method of claim 1 wherein sending the first wireless message includes sending the first wireless message with a message identifier, wherein the message identifier is capable of causing the located kiosk to initiate the commercial operation.

7. The computer implemented method of claim 1 wherein the first and second wireless messages are sent based on at least one of a Bluetooth, NFC, or Wi-Fi technology.

8. The computer implemented method of claim 1 wherein the located kiosk is a consumer-operated kiosk for vending DVDs.

9. The computer implemented method of claim 1 wherein the first wireless message from the mobile device includes a message type identifier and a payload corresponding to the message type identifier, and wherein the kiosk operation initiated at the located kiosk is based at least in part on the message type identifier.

10. At least one tangible, computer-readable medium that, when executed by at least one data processing device, causes a consumer-operated kiosk to perform a method comprising:

receiving a first wireless message from a mobile device of the user, wherein the first wireless message is a discovery message configured to determine a location of a kiosk in range of the user;

receiving from the mobile device, a second wireless message to initiate a kiosk operation;

in response to receiving the second wireless message, initiating execution of the kiosk operation, wherein the kiosk operation is based at least in part on content of the second wireless message; and sending a third wireless message to the mobile device, wherein the third wireless message includes instructions for interacting with the kiosk via the mobile device.

11. The computer-readable medium of claim 10 wherein the second wireless message is for at least one of renting a product from the kiosk, vending a product from the kiosk, and returning a product to the kiosk.

12. The computer-readable medium of claim 10 wherein the instructions in the third wireless message sent to the mobile device are in a format configured for audible play at the mobile device.

13. The computer-readable medium of claim 10 wherein the discovery message requests an indication from the kiosk that the kiosk is available to wirelessly interact via the mobile device.

14. The computer-readable medium of claim 10, further comprising:
  in response to receiving first wireless message from the mobile device, retrieving an electronic kiosk identifier that uniquely identifies the kiosk and sending the electronic kiosk identifier in a first wireless reply message to the mobile device.

15. A consumer-related kiosk, the kiosk comprising:
  a processor;
  a storage medium;
  a wireless communication device configured to:
    initiate a commercial operation with a handheld device of a user by receiving a first wireless message configured to determine a location of a kiosk in range of the user, wherein the first wireless message is a discovery message,
    in response to receiving the first wireless message, send a second wireless message to the handheld device, wherein the second wireless message contains a kiosk identifier, and
    receive a third wireless message from the handheld device, wherein the third wireless message is configured to identify a user-selected product contained in the kiosk; and
  a product dispenser configured to dispense the user-selected product from the kiosk, wherein the product is dispensed at least partially in response to receiving the third wireless message.

16. The consumer-related kiosk of claim 15 wherein the wireless communication device is further configured to:
  receive a fourth wireless message, wherein the fourth wireless message includes information related to payment for renting the user-selected product.

17. The consumer-related kiosk of claim 15 wherein the wireless communication device is further configured to:
  send a fourth wireless message to the handheld device, wherein the fourth wireless message contains information related to purchasing the user-selected product, and
  receive a fifth wireless message, wherein the fifth wireless message includes information related to payment for purchasing the user-selected product.

* * * * *